US009866638B2

(12) United States Patent
Heymann et al.

(10) Patent No.: US 9,866,638 B2
(45) Date of Patent: *Jan. 9, 2018

(54) SESSION-RETURN ENABLING STATEFUL WEB APPLICATIONS

(71) Applicant: SAP SE, Walldorf (DE)

(72) Inventors: Juergen Heymann, Walldorf (DE);
Udo Offermann, Walldorf (DE);
Roman Hayer, Walldorf (DE);
Bernhard Drittler, Walldorf (DE);
Rainer Brendle, Walldorf (DE)

(73) Assignee: SAP SE, Walldorf (DE)

( * ) Notice: Subject to any disclaimer, the term of this patent is extended or adjusted under 35 U.S.C. 154(b) by 580 days.

This patent is subject to a terminal disclaimer.

(21) Appl. No.: 13/960,742

(22) Filed: Aug. 6, 2013

(65) Prior Publication Data
US 2014/0019523 A1    Jan. 16, 2014

Related U.S. Application Data

(63) Continuation of application No. 10/727,140, filed on Dec. 2, 2003, now Pat. No. 8,527,636.
(Continued)

(51) Int. Cl.
*G06F 15/16*    (2006.01)
*H04L 29/08*    (2006.01)
(Continued)

(52) U.S. Cl.
CPC ........ *H04L 67/142* (2013.01); *G06F 17/3089* (2013.01); *G06F 17/30873* (2013.01);
(Continued)

(58) Field of Classification Search
CPC ............... H04L 67/1027; H04L 67/14–67/156
(Continued)

(56) References Cited

U.S. PATENT DOCUMENTS 5,884,312 A    3/1999    Dustan et al.
5,961,601 A    10/1999    Iyengar
(Continued)

FOREIGN PATENT DOCUMENTS

EP    1388782 A1    2/2004
WO    WO-01/97012 A2    12/2001
(Continued)

OTHER PUBLICATIONS

Lane, et al., "Web Database Applications with PHP & MySQL", O'Reilly Online Catalog, retrieved from the internet, http://www.oreilly.com/catalog/webdbapps/chapter/ch08.html, retrieved on May 19, 2004.

*Primary Examiner* — Jason Recek
(74) *Attorney, Agent, or Firm* — Mintz Levin Cohn Ferris Glovsky and Popeo, P.C.

(57) ABSTRACT

Mechanisms for allowing allow multi-session capability and session-return enabling stateful web applications include providing a start URL of a requested portal page with an "External Session ID" (ESID). The ESID is an argument that is different between the two instances of the application (on the same page), and leads to different/independent sessions in the server. When a user returns to the same page, the ESIDs are passed again with the individual application requests, and the server can then logically reconnect to the proper session and allow the user to continue. The ESID can be used to return to an application after the user has previously left to go to another application and then desires to come back, or even when the user closed the browser and restarts the application later.

22 Claims, 2 Drawing Sheets

Related U.S. Application Data

(60) Provisional application No. 60/430,503, filed on Dec. 2, 2002.

(51) Int. Cl.
*G06F 17/30* (2006.01)
*H04L 29/06* (2006.01)

(52) U.S. Cl.
CPC .............. *H04L 29/06* (2013.01); *H04L 67/02* (2013.01); *H04L 67/14* (2013.01); *H04L 67/16* (2013.01); *H04L 67/2842* (2013.01); *H04L 69/329* (2013.01)

(58) Field of Classification Search
USPC .................................................. 709/227–228
See application file for complete search history.

(56) References Cited

U.S. PATENT DOCUMENTS

| | | | |
|---|---|---|---|
| 6,092,196 A | 7/2000 | Reiche | |
| 6,098,093 A | 8/2000 | Bayeh et al. | |
| 6,544,295 B1 * | 4/2003 | Bodnar | G06F 17/30884 707/E17.114 |
| 6,883,015 B1 * | 4/2005 | Geen | G10L 15/30 703/23 |
| 6,961,776 B1 * | 11/2005 | Buckingham | G06F 9/541 709/219 |
| 6,981,263 B1 * | 12/2005 | Zhang | G06Q 50/188 709/217 |
| 6,986,155 B1 | 1/2006 | Courtney et al. | |
| 7,277,945 B1 * | 10/2007 | Shah | H04L 67/1002 709/223 |
| 7,286,651 B1 * | 10/2007 | Packingham | H04W 4/00 379/202.01 |
| 8,527,636 B2 | 9/2013 | Heymann et al. | |
| 2002/0078212 A1 | 6/2002 | Besaw et al. | |
| 2002/0099936 A1 | 7/2002 | Kou et al. | |
| 2002/0112054 A1 * | 8/2002 | Hatanaka | H04L 29/06 709/225 |
| 2002/0198883 A1 * | 12/2002 | Nishizawa | G06F 17/30902 |
| 2002/0198941 A1 * | 12/2002 | Gavrilescu | G06F 17/30873 709/205 |
| 2003/0061512 A1 | 3/2003 | Flurry et al. | |
| 2003/0084034 A1 | 5/2003 | Fannin | |
| 2003/0167333 A1 * | 9/2003 | Kumar | G06F 9/465 709/227 |
| 2004/0024881 A1 * | 2/2004 | Elving | H04L 67/1008 709/227 |
| 2004/0034769 A1 | 2/2004 | Bacha et al. | |
| 2004/0085366 A1 * | 5/2004 | Foster | G06F 17/30899 715/854 |
| 2006/0218287 A1 * | 9/2006 | Dodrill | H04L 12/587 709/227 |

FOREIGN PATENT DOCUMENTS

| | | |
|---|---|---|
| WO | WO-02/059787 A1 | 8/2002 |
| WO | WO-02/079973 A2 | 10/2002 |

* cited by examiner

SESSION-RETURN ENABLING STATEFUL WEB APPLICATIONS

CROSS REFERENCE TO RELATED APPLICATIONS

This application is a continuation under 35 U.S.C. §120 of U.S. patent application Ser. No. 10/727,140, filed on Dec. 3, 2003, which claims priority under 35 U.S.C. §119(e) to U.S. Provisional Patent Application No. 60/430,503, filed on Dec. 2, 2002.

BACKGROUND

The following description relates to server session management and backwards navigation from a browser in a stateful server session.

A portal is a mechanism by which various web content can be assembled into one or more portal pages delivered to a client and displayed in a browser application running on the client. The portal pages are typically delivered from a server according to the hypertext transfer protocol (HTTP). A web application is a separate callable unit stored on any server, and typically called via uniform resource locator (URL) address. On the portal level, the callable unit and its content is sometimes called a portlet (also called pagelets, iViews, webparts, etc.). Thus, an application appears as a portlet, which is assembled onto one or more web pages according to a page layout scheme. Pages are the navigation units in a portal, i.e. the user always navigates to a page, which then calls all the portlets on that page.

For simplicity, assume that a portlet is isolated, i.e. the content runs inside a page structure called an IFRAME. A user can navigate around a portlet in several ways, such as "clicking" inside the portlet using a mouse device and/or pointer. For intra-application-navigation (e.g. navigation to a "next screen"), the user is considered "inside" an application which doesn't affect the page level around the portlet or application. When the user navigates on the portal level, the user also selects a new portal page or even the same portal page as a target. When that occurs, the old portal page is displaced in the browser, as is the portlet containing an application. Accordingly, the user "leaves an application" when he or she leaves the portal page that contains an application.

State in Web Applications

Web-based applications consist of a sequence of pages delivered from a server to a client. When a user navigates through the sequence of pages, the server maintains "state," i.e. retains data about user input on previously viewed pages, navigation history, and data needed by the application to respond to the user, etc. State is typically kept in a session by the server, and identified for each session by a session identifier ("sessionID") generated by the server. The sessionIDs can be kept in a browser "cookie" (information for future use that is sent by the server and stored on the client) or in a URL included in the server response. All non-trivial applications need server state to be able to respond quickly to user request. Therefore, most business applications on the web are "stateful."

Normally, there can only be one session per user and/or per browser process. A web application is "multi-session enabled" when a user can run two or more instances of the same application at the same time—in the extreme case side-by-side in two IFRAMEs in the same browser window. Multi-session applications are started with a "start-URL" that has no sessionID, and then the server creates a session and maintains the session association by putting the sessionID in URLs (URL rewriting) or in cookies. A truly multi-session enabled application cannot use cookies for session-IDs since the cookies would overwrite each other when they meet in the same browser window (process), and there is no way for the server to distinguish between the two parallel requests that come from two IFRAMEs in the same browser. Thus, multi-session capability requires sessionIDs to be encoded in URLs. This causes a complication for "session-return" that will be described further below.

One issue appears in the combination of multi-session and page "back" navigation. To allow multi-session capability, session IDs must be encoded in URLs, which means that a portal page contains a start URL, and then server responds with a new session for each applications instance. But when the user comes "back" to the same page, the same start URLs are fired, and the server again has no way to distinguish between the two instances in the two IFRAMEs on the page.

Basic Session Termination

One method for server session termination is described in related U.S. application Ser. No. 09/614,167, filed on Jul. 11, 2000, and entitled, "Method, Apparatus and System for Network-Based Peer-to-Peer Business Transactions", which is incorporated by reference herein. The system scenario is a portal calling web applications.

Users enter applications and request pages/screens from server-based applications. Applications need resources such as "session state" to perform requested dialogue or online transactions, possibly need to acquire locks or other critical resources during some part of a transaction. When the user leaves the application in the middle of a transaction, the server does not technically notice, since HTTP is connectionless, and this can happen by navigating to another portal page, or even simply closing the browser. When the user does not explicitly terminate the application, such as when the user logs off from the session, the server's session state (and possibly even locks) are kept on the server, wasting resources until timeout. Therefore, the portal must notify the server and/or application when the user leaves the application, so that the server can release the resources associated with the application.

Basic session termination works as follows: the portal provides a Session Manager (SM) that runs partly hidden in the portal/browser. When an application is started inside a portal page, as part of its response in the hypertext markup language it sends a "session termination URL" to the SM. When the current page is displaced and the SM has stored a session termination URL for the current page, this session termination URL is sent back to the server so that the server can then release the session and all its associated resources. This is how the server gets "notified" that the application was left, and its resources should be released.

The Need for Session-Return Enabling

The "Basic Session Termination" described above terminates the session as soon as the user leaves the application, i.e. when the user jumps to another page by navigation, or by browser shortcut, etc. However, users typically want to be able to explore various pages of a second application or page, and then go back to a previously-visited page/application and continue working there. In essence, users want stateful applications, that are often exposed in portals, to behave mostly like static content with respect to the "back" function in the browser.

One problem is that it is not known whether the user will ever come back to the first page/application, which means that the server needs to immediately be notified when the user leaves the application, and then releases its session state at that time. Therefore, one issue includes modifying the Basic Session Termination concept to allow a "Session-Return," i.e. the ability of a user to return to a previous-visited session in the same state as when the user left the session.

Thus, applications cannot be allowed to simply "wait" to return or continue later, but must indeed terminate immediately when the user leaves. In order to be able to return, the application would need to first store whatever part of the state is necessary to return. It is undesirable to store the full internal state, or the state of some other form, such as storing all user interface fields for example. Further, an application cannot be expected to store its full current state at any given time, so that any working intermediate state can be saved fully. Thus, the persistent part of the session state will be stored and the transient state will be discarded. The state that is stored persistently is called the "session return state," and would generally include the IDs of the objects being shown/edited, as well as possibly some UI state, such as which tab is active in a tab strip, the open-closed state of trees, etc. Restarting the application with these parameters reloaded from the session return state will give the desired "back" or session-return perception to the user, and the application enough data to restart itself with that data.

Thus, it can be assumed that the application is able to store its session return state when it receives a termination request, and can be restarted such that it will reload the previous session return state to show substantially the same output as when the user left. However, this means that the interpretation of the termination request of the Basic Session Termination concept has changed from "completely terminate" to "store session return state and then terminate." This new interpretation can be called "session minimize." How much an application stores in the session return state is variable and up to the application. In a case where nothing is kept, the session minimize is the same as the conventional terminate completely—in which the application restarts from scratch each time.

When an application has been restarted, and the "session return state" has been loaded, a problem occurs when multiple instances of the application are active at the same time. The server will not know which "session return state" to load when restarting the application. The problem exists regardless whether the application is started in separate browser windows or even in the same browser window (i.e. inside two IFRAMEs in a portal page, etc.).

SUMMARY

This document discloses a method and system to enable users in a portal environment to navigate between applications in a coherent or "stateful" manner. Without this feature, a user of a web application would lose the state of an application they left when navigating to another applications. In one embodiment, a computing system is configured for "Session Return Enabling," i.e. a technique that allows stateful web applications to gracefully support "browser back" functions, or generically, "back in any form." This is an important feature for providing stateful web applications in portals to improve the overall user experience.

Instead of the server generating sessionIDs, the client caller, typically a portal or via the browser, passes to the server a given sessionID that the caller wants to use to refer to a session at start time and thereafter, for termination and restart for example. This given session ID, called an External SessionID (ESID), is passed each time an application is started, preferably as a URL parameter in the start URL of the application.

If the ESID does not refer to an active or minimized session for which a return state is kept, a new session is created and associated with the ESID. During this session/application, the ESID is irrelevant, as the server may still keep its "old" sessionID encoded in the URLs or cookies in addition to the "new" ESIDs. When the user leaves the page/application, however, the client SM notifies the server of this fact by sending the termination URL to the server, which includes the ESID. The server then minimizes its state and stores it under the ESID key. When an application start URL is sent with an ESID to the server, and the server finds it has a minimized session (i.e. a session return state) stored for the ESID, the application is started and given the session return state as initial parameters ("init parameters").

One method for session-return to enable a stateful web application includes receiving a termination URL from a client relating to a terminated web application session, the termination URL including an ESID identifying the terminated web application session. The method further includes storing a state related to the terminated web application session associated with the ESID, and receiving a request from the client for a new web application session. The method further includes determining whether the request includes an identifier that corresponds to the ESID of the terminated web application session. If the identifier corresponds to the ESID of the terminated web application session, the method includes serving the new web application session according to the state related to the terminated web application session.

If an application is continually called using the same ESID, the application can be terminated when the user leaves, yet when it is started again continue at substantially the same point as when it terminated. To allow multiple instances, session termination, and session return of the same application, the ESID must be generated and sent repeatedly by the client rather than the server.

Thus, an ESID is used to refer to a session at startup of an application, and when re-starting the application for session return. This provides a stateful application, and allows the server to minimize state for the application, or in other words keep only "session return" state, but still fully terminate the application. Further, the use of an ESID allows for the application to be "continued" in a meaningful way.

A benefit of the disclosed techniques is that the server releases all resources related to an application upon termination of the application, i.e. as soon as the user leaves. However, the techniques described herein allow the user to come back to the application and continue in a manner such that the user does not to have to start over each time the user visits the application, and allows multiple instances of applications to be distinguished at the same time. The techniques that use an ESID enable all of these features.

The details of one or more embodiments are set forth in the accompanying drawings and the description below. Other features, objects, and advantages will be apparent from the description and drawings, and from the claims.

BRIEF DESCRIPTION OF THE DRAWINGS

These and other aspects will now be described in detail with reference to the following drawings.

DETAILED DESCRIPTION

The systems and techniques described here relate to enabling a browser to navigate back to reach a previously-visited application page in the same state as when previously visited in a previous session.

To allow multi-session capability, a mechanism to distinguish between two instances in two IFRAMEs on a page includes providing a start URL of the portal page with an "External Session ID" (ESID). The ESID is an argument that is different between the two instances of the application (on the same page), and leads to different/independent sessions in the server. Thus, when the user returns to the same page, the ESIDs are passed again with the individual application requests, and the server can then logically reconnect to the proper session and allow the user to continue.

Thus, instead of letting the server create a session ID arbitrarily, the portal or caller passes an ESID when starting (i.e. when first calling) an application on the server. This ESID can then be used to come back to the application, in situations such as after the user left to go to another application and then came back, or even when the user closed the browser and restarts the application later. The ESID allows the "session return" that will be described in further detail.

Note that the ESIDs is independent from session management (see below) and from the portal. An ESID can be used on any URL that starts an application. When a server simply lets sessions or applications wait for timeout (instead of terminating them), the ESID can be used when the application is started again (start URL). Accordingly, a pending session/application instance is selected, and allows the user to continue with that session.

ESIDs can be arbitrary strings that are used as keys to select sessions, e.g. "page3/app1" and "page3/app2" for example. ESIDs can also be explicit fixed values that are not generated to denote a particular page context as in the previous example, or "no value" which means that the application is fully terminated when left, and always started from scratch when the user re-enters. This is a matter of configuration that can be finely tuned as required. Also, an element such as a "WindowID" can be appended to an ESID so that one can have two instances of pages in two browser windows that run independent instances of applications.

The use of ESIDs can also extend the basic session termination mechanism. Instead of requiring the server to send a session termination URL to the session manager, the client/portal can send a standard termination notification passing the ESID. This has the additional benefit that session management now also supports any MIME type. It requires that the server understand the ESID-based termination notification, and that all ESIDs coming to a server (for any user) are different.

Figure 1:
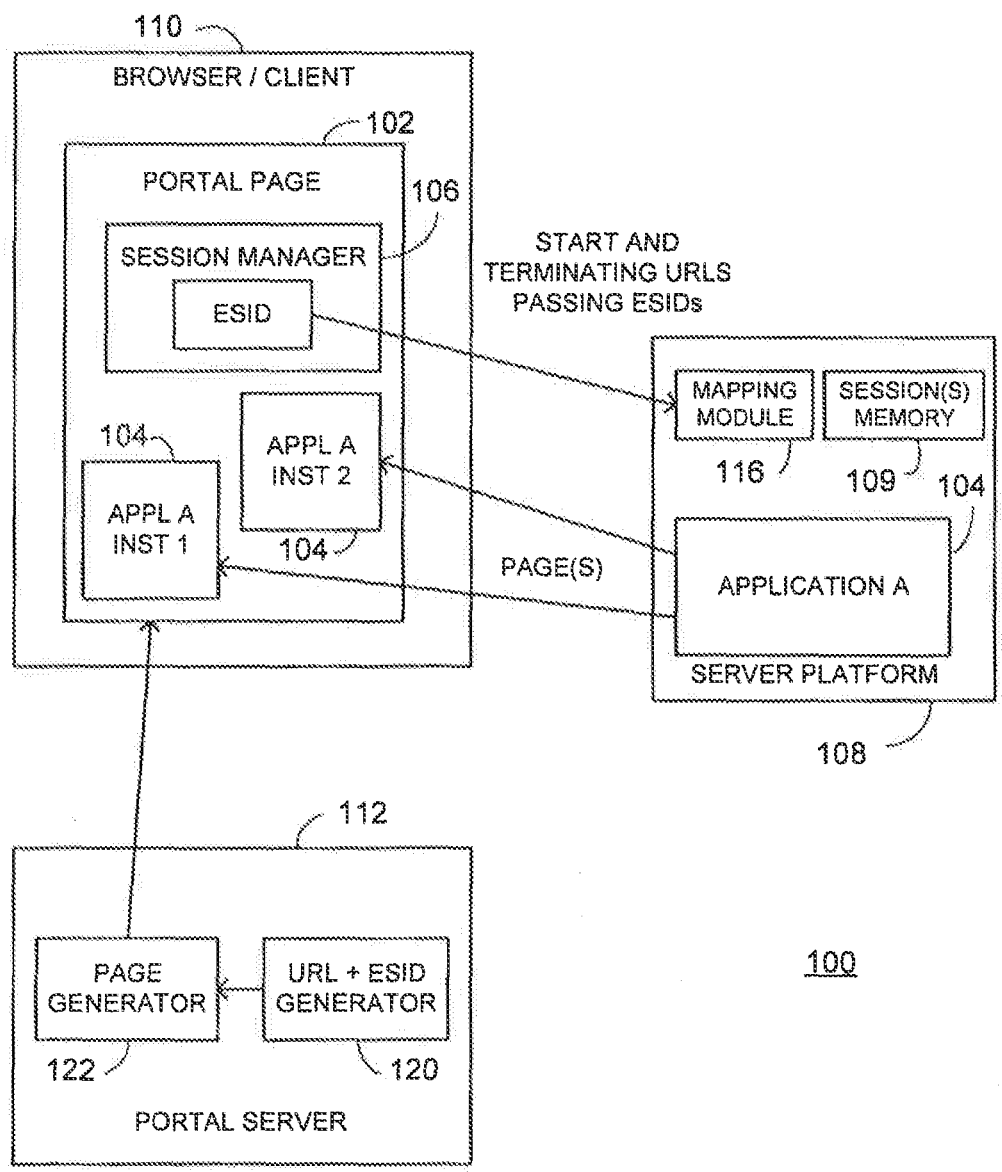
FIG. 1 is a block diagram of a web application session.

FIG. 1 shows a block diagram of a web application session 100, including a portal page 102 that displays one or more instances of an application 104, i.e. one or more web pages and their content, served from server 108 platform, i.e. by an application server or the like. Each instance of the application 104 is ultimately displayed in a browser operating on a client 110. The application 104 of the web application session 100 can also be displayed simultaneously with other web content, such as content from a local client application or from another application server. The portal page 102 includes a session manager (SM) 106 for managing each application session 100 based on session information received from each instance of the application 104. The SM 106 can be page-level script code. In one embodiment, the SM 106 identifies a session according to a user's navigation and activities through various pages of the application 104.

In order for a user to visit a previously-viewed page, the server platform 108 keeps some "state" of the session, i.e. information relating to the instance of the application, even when the user leaves the application and provokes the session manager to send a termination notification to the application server 118. In one embodiment, the server platform 108 includes a session memory 109 for storing a state of a session of an application that a user has left. The state includes an instance identifier, which further includes a page identifier of each page of the session. An instance identifier can be stored for each page visited in the session, thereby providing a memory having a number of instance identifiers. The session memory 109 can be in the memory of a computer or in a database.

A portal server 112 includes a page generator 122 for generating the portal page 102. The portal server 112 also includes a URL generator 120. As a user navigates within a session and out of an application, the URL generator 120 of the portal server 112 provides the ESID, i.e. an instance identifier. The ESID also includes a page identifier of each page visited in the session. Accordingly, when a user wants to revisit a session, and have a page of the session displayed in the same state as when they left it, the portal page 102 will send to the server platform 108 a start URL for the page requested, as well as an ESID associated with the requested page.

Using the ESID, the view state is saved when the user leaves the page, and is found again when the user revisits. The ESID can be typically formatted to include a page identifier (pageID). Since a user can use more than one window either through the portal page 102 or on the browser/client 110, the ESID may also contain a window identifier (windowID). Alternatively, ESIDs can be specified that lead to sessions in which the same page is shared by many portal pages 102. Accordingly, the same ESID can be specified from different places, and on multiple paths.

ESIDs are specified as page properties, and can be passed via URL to the server platform 108. When a requested application does not include an ESID, the application simply starts fresh each time it is requested. When the server platform 108 receives the ESID and start URL, a mapping module 116 maps the ESID to particular session, i.e. it checks whether a corresponding ESID already has been stored in the session memory 109. If the ESID does not exist, the server platform 108 creates a new instance of the session of the requested application 104. If the ESID does exist, the server platform 108 starts the application 104 and passes it in the saved state to the portal page 102.

In one embodiment, the ESIDs are held in the client SM 106. The portal server 112 generates the portal page 102, includes the generic SM 106, and also the FRAME(s) for the application(s) 104. Since the ESIDs are also generated by the portal server 112, and added to the start URLs for the FRAMEs, the request to the application comes from the content FRAMES of each instance of the application 104. The portal server 112 knows the ESIDs, and can generate embedded scripting into the portal page 102 to enter the ESIDs into the SM 106. The page 102 itself has no knowledge of the ESIDs as no ID for the page is needed, and it just carries the SM 106 that contains the ESIDs.

In another embodiment, ESIDs are passed on the start URLs, but not kept in the SM 106, but kept in the portal server 112 only. This time the portal page 102 gets a unique ID under which the portal server 112 stores the ESIDs that were generated for this page. The page ID is needed since a user can have multiple browser windows open with portal content at the same time. When the user leaves the page, the SM 106 notifies the portal server 112, passing the page ID. The portal server 112 then generates a set of termination requests with the ESIDs, and sends this "termination page" to the client 110, from which they are transmitted to the appropriate server platform 108.

Figure 2:
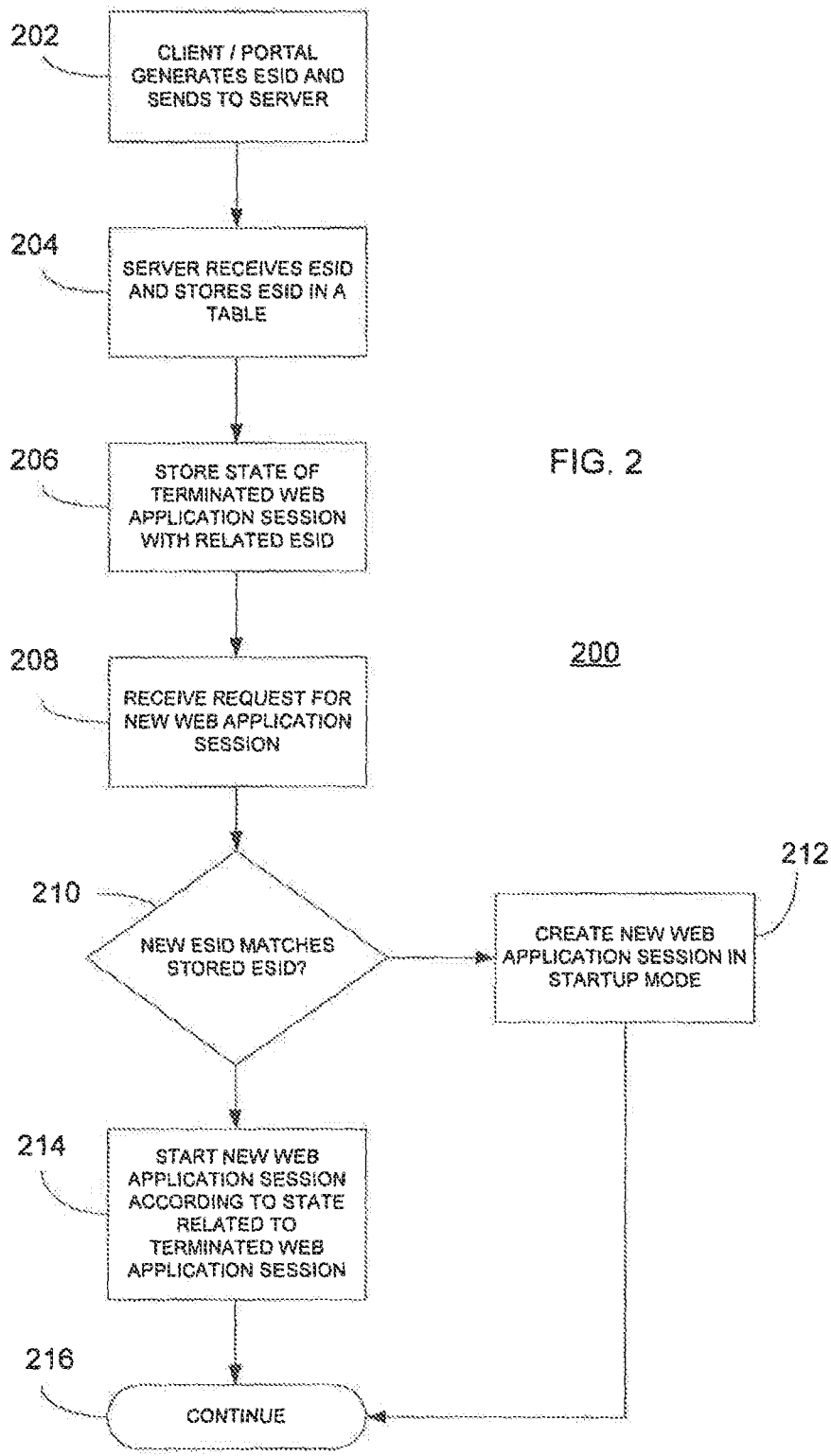
FIG. 2 is a flowchart of a method of session-return enabling stateful web applications.

FIG. 2 is a flowchart of a method 200 of session-return enabling stateful web applications. At 202, the client caller, typically a portal or via the browser, passes to the server a given ESD that the caller wants to use to refer to a session at start time and thereafter, for termination and restart for example. The ESID is passed each time an application is started, preferably as a URL parameter in the start URL of the application, however other ways of passing the ESID to the server may be used.

The server receives the ESID at 204. During each session/application, the ESID is irrelevant. In fact, the server may still keep its "old" sessionID encoded in the URLs or cookies in addition to the "new" ESIDs. When the user leaves the page/application, however, the client SM sends a termination URL with ESID to the server, which then minimizes its state and stores it under the ESID key, at 206. The server releases all resources related to an application upon termination of the application, i.e. as soon as the user leaves.

When an application start URL with ESID is sent to the server at 208, and the server determines whether it has a minimized session (i.e. a session return state) stored for this ESID by mapping the ESID in the request with one or more stored ESIDs previously received, at 210. If the request ESID does not refer to an active or minimized session for which a return state is kept, a new session is created and associated with the request ESID at 212. If the server has a session return state related to the request ESID, the application is started and given the session return state as initial parameters ("init parameters") at 214. The session continues at 216.

Accordingly, if an application is continually called using the same ESID, the application could be immediately terminated when the user leaves, yet continue at substantially the same point when it is started again. For multiple instances, session termination, and session return of the same application, the ESID must be generated and sent repeatedly by the client. Thus, an ESID is used to refer to a session at startup of an application, and when re-starting the application for session return.

In one embodiment, an ESID is a key string with no internal structure. Thus, a user can simply call an application X three times with different ESIDs, e.g. by a URL of the type http://server/X?ESID=a. The disclosed technique preferably uses the Basic Session Management function of a client SM, which sends termination notifications to the server each time the user leaves the application or a page of the application.

In one example, a portal employs the Basic Session Management and generates the ESIDs. The portal includes multiple pages having names such as "/roles/salesrep/ovw_page4" or the like. Now, consider two instances of an application "orderdetail" as portlets on the same page "od1" and "od2." Using cookies for server sessionIDs, both pages would share the same sessionID, and thus refer to the same server session. Thus, a user cannot browse independently in od1 and od2, as one page would always show the data of the other. If the server/application uses URL-encoded sessionIDs, od1 and od2 could be separate, but when the user leaves, they must be terminated. When the user returns, they would always start from scratch since the server does not know where the requests come from, and the start URLs always start a new session. Now, using ESIDs such as "/roles/salesrep/ovw_page4/od1" and "/roles/salesrep/ovw_page4/od2," there are two clearly defined server sessions that correspond to the instances of these applications on their respective page. When the user returns to one or both pages, both sessions can continue where they left off.

The values of ESIDs also have another implication: when the same application is provided on two pages, and use the "page path" as the exemplary ESIDs shown above, two independent sessions are provided. This way an application can be used independently at two locations in the portal navigation.

The ESID also handles another situation in which a standard sessionID lacks capability. In another example, when the user opens a new browser window with a "ctrl-N" function, i.e. a new browser window, but using the same processes such as the same shared cookies, a similar situation occurs as with two applications side-by-side. Either the applications refer to the same server session, and thus confusingly affect each other, or a new session is started, but the user can never return to either one. When a windowID is appended to the ESID, a new window will automatically refer to a new session and/or application instance. Thus, opening a new parallel and independent workspace for the same application can now be accomplished.

The use of the ESID mechanism as described above requires a context that provides the Basic Session Termination as a prerequisite. Alternatively, however, in an alternative scenario the ESIDs could be appended manually to the application start URL by an administrator. In the context of a portal, the ESID values can be generated dynamically, including a static part as a path to of the application (e.g. "/roles/salesrep/ovw_page4/od1") and a dynamic part such as "<windowID>." Preferably, ESIDs are generated using URL templates that combine various dynamic values.

According to one method, the server keeps some "state" even when the user leaves an application and the session manager sends the termination notification. This state can be kept as "read only/view state" (e.g. which object had been selected, tree state, etc.). This state is typically small and can be kept for a longer time. When the user revisits the same page of the application, the server reloads the "view state" and shows the same page in the same state as when the user left.

To enable the session-return feature along with the SRM feature, the SRM concept and its interpretation by the server, instead of just receiving the CLOSE command, may receive different more detailed notifications such as follows:

LEAVE: Indicates that the user left application, e.g., by navigating through the portal. This is the same as the previous CLOSE command. However, in this case, the application should "minimize", i.e. minimize its use of resources, rather than terminate. The application can minimize by, e.g., writing out dialog state, going to read-only mode, releasing all locks and memory, etc. The application may store just enough information to be able to "restore" and come back to the same state. The application can record the user's activity in the application, e.g., navigation through fields and entering data, and then serialize the data. This may require only 20-30 kBytes of memory. The user may never come back, and there will be no further notification (until LOGOFF). The resulting state should be able to exist for a long time (timeout), since minimal resources are being used.

RESTORE: Received after page-back with an existing ESID. The application should revert the "minimize" operation, i.e., reads the data back and restores the previous state. The application is now in the "expensive" (resource-wise) state again.

LOGOFF: Sent when the user actually leaves the portal. This is an optional notification—in addition to LEAVE— that the application can now immediately terminate instead of minimizing.

Note that the notifications of LEAVE, RESTORE and LOGOFF are notifications the application gets from the server. The SRM only sends CLOSE (now mapped to LEAVE), and LOGOFF. The server recognizes the "found existing ESID" case (session-return) and then sends the RESTORE notification to the application.

So far we are collecting for each ESID and application (per user) a 'session return state'. The question naturally arises, how can one ever In order to start a new instance from scratch, an additional LOGOFF event can be defined that is sent to the application(s) when the user leaves the application portal altogether. When the server receives the LOGOFF notification with the ESIDs, it will discard the session return states for the ESIDs.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the term "machine-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back-end component (e.g., as a data server), or that includes a middleware component (e.g., the application server), or that includes a front-end component (e.g., a client computer having a graphical user interface or a Web browser through which a user can interact with an implementation of the systems and techniques described here), or any combination of such back-end, middleware, or front-end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

Although a few embodiments have been described in detail above, other modifications are possible. Portions of this disclosure discuss operation though a portal, but any of a number of access systems and methods may be used to manage web application sessions. The logic flows depicted in FIG. 2 do not require the particular order shown, or sequential order, to achieve desirable results. Other embodiments may be within the scope of the following claims.

The invention claimed is:

1. A method comprising:
   starting a first session instance of an application in response to receiving, at an application server comprising at least one programmable processor, a first external session identifier (ESID) at a first time, the application comprising a sequence of webpages delivered from the application server to a client caller running on a computing device, the first external session identifier having been generated externally to the application server and sent to the application server from the client caller, the first external session identifier being different from a second external session identifier for a second session instance of the application running at the computing device, and the starting comprising allocating first application server resources to the first session instance;
   terminating the first session instance by the application server, the terminating of the first session instance comprising releasing the first application server resources allocated to the first session instance, the terminating of the first session instance further comprising associating first session return state information for the first session instance with the first external session identifier and persisting the first session return state information in a session memory of the application server, the first session return state information characterizing a first state of the first session instance at termination of the first session instance, the first session return state information including user inputs on at least one webpage from the sequence of webpages that has been delivered by the application server to the client caller prior to the termination of the first session instance; and
   restarting, by the application server, the first session instance in response to receiving, at the application server, the first external session identifier at a second time, the second time receiving the first external session identifier being subsequent to the first time receiving the first external session identifier, the restarting comprising restoring the first session instance to the first state characterized by the first session return state information persisted in the session memory of the application server.

2. A method as in claim 1, further comprising:
starting the second session instance of the application in response to receiving the second external session identifier (ESID) at the application server, the second external session identifier also having been generated externally to the application server, the starting of the second session instance comprising allocating second application server resources to the second session instance; and
wherein the application server responds to the receiving of the first external session identifier at the second time by at least restoring the first session instance using the first session return state information persisted in the session memory of the application server independently of the second application server resources allocated to the second session instance.

3. A method as in claim 2, further comprising:
terminating the second session instance, the terminating of the second session instance comprising associating second session return state information for the second session instance with the second external session identifier and persisting the second session return state information in the session memory of the application server, the second session return state information characterizing a second state of the second session instance at termination of the second session instance, the second state of the second session instance at termination of the second session instance being different from the first state of the first session instance at termination of the first session instance.

4. A method as in claim 1, further comprising:
determining, in response to the receiving of the first external session identifier at the first time, that no first session return state information associated with the first external session identifier has been previously persisted in the session memory; and
in response to determining that no first session return state information associated with the first external session identifier has been previously persisted in the session memory, creating the first session instance in a startup mode.

5. A method as in claim 1, further comprising receiving the first external session identifier, and wherein the client caller comprises a portal page.

6. A method as in claim 1, wherein the receiving of the first external session identifier at the first time further comprises receiving the first external session identifier as part of a start uniform resource locator (URL).

7. A method as in claim 1, wherein the application comprises a multi-session enabled web application, and the first session instance supports a first instance of the multi-session enabled web application running at the client computer, the first instance of the multi-session enabled web application making use of the application server resources allocated to the session instance.

8. A method as in claim 1, wherein the first session instance and second session instance of the application are running simultaneously in a same browser window at the computing device.

9. A method as in claim 1, wherein the first session instance of the application is running in a first browser window at a same time that the second session instance of the application is running in a second browser window.

10. A method as in claim 9, wherein the first external session identifier includes a window identifier corresponding to the first browser window and second external session identifier includes a window identifier corresponding to the second browser window.

11. A computer program product comprising a non-transitory machine-readable medium storing instructions that, when executed by an application server comprising at least one programmable processor, cause the application server to perform operations comprising:
starting a first session instance of an application in response to receiving, at an application server, a first external session identifier (ESID) at a first time, the application comprising a sequence of webpages delivered from the application server to a client caller running on a computing device, the first external session identifier having been generated externally to the application server and sent to the application server from the client caller, the first external session identifier being different from a second external session identifier for a second session instance of the application running at the computing device, and the starting comprising allocating first application server resources to the first session instance;
terminating the first session instance, the terminating of the first session instance comprising releasing the first application server resources allocated to the first session instance, the terminating of the first session instance further comprising associating first session return state information for the first session instance with the first external session identifier and persisting the first session return state information in a session memory of the application server, the first session return state information characterizing a first state of the first session instance at termination of the first session instance, the first session return state information including user inputs on at least one webpage from the sequence of webpages that has been delivered by the application server to the client caller prior to the termination of the first session instance; and
restarting, by the application server, the first session instance in response to receiving, at the application server, the first external session identifier at a second time, the second time receiving the first external session identifier being subsequent to the first time receiving the first external session identifier, the restarting comprising restoring the first session instance to the first state characterized by the first session return state information persisted in the session memory of the application server.

12. A computer program product as in claim 11, wherein the operations further comprise:
starting the second session instance of the application in response to receiving the second external session identifier (ESID) at the application server, the second external session identifier also having been generated externally to the application server, the starting of the second session instance comprising allocating second application server resources to the second session instance; and
wherein the application server responds to the receiving of the first external session identifier at the second time by at least restoring the first session instance using the first session return state information persisted in the session memory of the application server independently of the second application server resources allocated to the second session instance.

13. A computer program product as in claim 11, wherein the operations further comprise:
   determining, in response to the receiving of the first external session identifier at the first time, that no first session return state information associated with the first external session identifier has been previously persisted in the session memory; and
   in response to determining that no first session return state information associated with the first external session identifier has been previously persisted in the session memory, creating the first session instance in a startup mode.

14. A computer program product as in claim 11, wherein the operations further comprise receiving the first external session identifier, and wherein the client caller comprises a portal page.

15. A computer program product as in claim 11, wherein the receiving of the first external session identifier at the first time further comprises receiving the first external session identifier as part of a start uniform resource locator (URL).

16. A computer program product as in claim 11, wherein the application comprises a multi-session enabled web application, and the first session instance supports a first instance of the multi-session enabled web application running at the client computer, the first instance of the multi-session enabled web application making use of the application server resources allocated to the session instance.

17. A system comprising an application server, the application server comprising at least one programmable processor; and a machine-readable medium storing instructions that, when executed by the at least one programmable processor, cause the at least one programmable processor to perform operations comprising:
   starting a first session instance of an application in response to receiving, at an application server, a first external session identifier (ESID) at a first time, the application comprising a sequence of webpages delivered from the application server to a client caller running on a computing device, the first external session identifier having been generated externally to the application server and sent to the application server from the client caller, the first external session identifier being different from a second external session identifier for a second session instance of the application running at the computing device, and the starting comprising allocating first application server resources to the first session instance;
   terminating the first session instance, the terminating of the first session instance comprising releasing the first application server resources allocated to the first session instance, the terminating of the first session instance further comprising associating first session return state information for the first session instance with the first external session identifier and persisting the first session return state information in a session memory of the application server, the first session return state information characterizing a first state of the first session instance at termination of the first session instance, the first session return state information including user inputs on at least one webpage from the sequence of webpages that has been delivered by the application server to the client caller prior to the termination of the first session instance; and
   restarting, by the application server, the first session instance in response to receiving, at the application server, the first external session identifier at a second time, the second time receiving the first external session identifier being subsequent to the first time receiving the first external session identifier, the restarting comprising restoring the first session instance to the first state characterized by the first session return state information persisted in the session memory of the application server.

18. A system as in claim 17, wherein the operations further comprise:
   starting the second session instance of the application in response to receiving the second external session identifier (ESID) at the application server, the second external session identifier also having been generated externally to the application server, the starting of the second session instance comprising allocating second application server resources to the second session instance; and
   wherein the application server responds to the receiving of the first external session identifier at the second time by at least restoring the first session instance using the first session return state information persisted in the session memory of the application server independently of the second application server resources allocated to the second session instance.

19. A system as in claim 17, wherein the operations further comprise:
   determining, in response to the receiving of the first external session identifier at the first time, that no first session return state information associated with the first external session identifier has been previously persisted in the session memory; and
   in response to determining that no first session return state information associated with the first external session identifier has been previously persisted in the session memory, creating the first session instance in a startup mode.

20. A system as in claim 17, wherein the operations further comprise receiving the first external session identifier, and wherein the client caller comprises a portal page.

21. A system as in claim 17, wherein the receiving of the first external session identifier at the first time further comprises receiving the first external session identifier as part of a start uniform resource locator (URL).

22. A system as in claim 17, wherein the application comprises a multi-session enabled web application, and the first session instance supports a first instance of the multi-session enabled web application running at the client computer, the first instance of the multi-session enabled web application making use of the application server resources allocated to the session instance.

* * * * *